US010143005B2

(12) United States Patent
Chendamarai Kannan et al.

(10) Patent No.: US 10,143,005 B2
(45) Date of Patent: Nov. 27, 2018

(54) UPLINK CONTROL RESOURCE ALLOCATION FOR DYNAMIC TIME-DIVISION DUPLEX SYSTEMS

(71) Applicant: QUALCOMM Incorporated, San Diego, CA (US)

(72) Inventors: Arumugam Chendamarai Kannan, San Diego, CA (US); Taesang Yoo, Riverside, CA (US); Siddhartha Mallik, San Diego, CA (US); Jelena Damnjanovic, Del Mar, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/874,160

(22) Filed: Oct. 2, 2015

(65) Prior Publication Data

US 2016/0135214 A1    May 12, 2016

Related U.S. Application Data

(60) Provisional application No. 62/077,112, filed on Nov. 7, 2014.

(51) Int. Cl.
*H04W 72/12* (2009.01)
*H04L 5/14* (2006.01)
(Continued)

(52) U.S. Cl.
CPC ........... *H04W 72/1284* (2013.01); *H04L 5/14* (2013.01); *H04L 47/27* (2013.01); *H04W 28/20* (2013.01);
(Continued)

(58) Field of Classification Search
None
See application file for complete search history.

(56) References Cited

U.S. PATENT DOCUMENTS 8,031,583 B2    10/2011    Classon et al.
8,526,373 B2 *   9/2013    Ishii ...................... H04W 72/04
                                                                370/329
(Continued)

FOREIGN PATENT DOCUMENTS

EP          1901511 A1 *   3/2008   ............. H04L 5/023
WO    WO 2015068968 A1 *   5/2015   ............ H04W 74/08

OTHER PUBLICATIONS

International Search Report and Written Opinion—PCT/US2015/054063—ISA/EPO—dated Jan. 4, 2016. (13 total pages).
(Continued)

*Primary Examiner* — Chi H Pham
*Assistant Examiner* — Vladislav Y Agureyev
(74) *Attorney, Agent, or Firm* — Arent Fox LLP

(57) ABSTRACT

Methods and apparatuses for managing uplink scheduling for one or more user equipment served by a network entity in a wireless communications system are presented. For instance, an example method is presented that includes generating, by the network entity, an uplink bandwidth allocation map, the uplink bandwidth allocation map defining an uplink bandwidth allocation for at least one of the one or more user equipment for at least one of a plurality of uplink transmission window lengths. In addition, the example method includes transmitting the uplink bandwidth allocation map to at least one of the one or more user equipment.

30 Claims, 15 Drawing Sheets

(51) Int. Cl.
*H04L 12/807* (2013.01)
*H04W 28/20* (2009.01)
*H04W 72/04* (2009.01)
*H04W 88/02* (2009.01)

(52) U.S. Cl.
CPC ... *H04W 72/0413* (2013.01); *H04W 72/1268* (2013.01); *H04W 72/1252* (2013.01); *H04W 88/02* (2013.01)

(56) References Cited

U.S. PATENT DOCUMENTS

| | | | |
|---|---|---|---|
| 2007/0064604 A1* | 3/2007 | Chen | H04L 1/0002 370/230 |
| 2007/0076654 A1* | 4/2007 | Bachl | H04W 72/0406 370/329 |
| 2007/0217362 A1 | 9/2007 | Kashima et al. | |
| 2008/0062914 A1 | 3/2008 | Olfat | |
| 2009/0207798 A1 | 8/2009 | Shan et al. | |
| 2009/0290549 A1* | 11/2009 | Tiirola | H04L 5/0053 370/329 |
| 2010/0002655 A1* | 1/2010 | Ofuji | H04J 13/0059 370/335 |
| 2012/0224540 A1* | 9/2012 | Kwon | H04W 76/02 370/329 |
| 2013/0016691 A1* | 1/2013 | Toyama | H04W 72/1252 370/329 |
| 2013/0077541 A1* | 3/2013 | Lin | H04L 1/1861 370/277 |
| 2013/0195043 A1* | 8/2013 | Chen | H04W 72/04 370/329 |
| 2013/0229996 A1* | 9/2013 | Wang | H04W 72/0413 370/329 |
| 2014/0071954 A1* | 3/2014 | Au | H04W 72/0446 370/336 |
| 2014/0133433 A1* | 5/2014 | Ahn | H04W 74/002 370/329 |
| 2014/0153539 A1* | 6/2014 | Seo | H04L 5/0053 370/330 |
| 2014/0192730 A1* | 7/2014 | Seo | H04L 5/0053 370/329 |
| 2014/0301345 A1* | 10/2014 | Kim | H04L 5/0053 370/329 |
| 2014/0362796 A1* | 12/2014 | Seo | H04L 1/1854 370/329 |
| 2014/0376433 A1* | 12/2014 | Li | H04W 52/0209 370/311 |
| 2015/0036607 A1* | 2/2015 | Park | H04L 5/0023 370/329 |
| 2015/0063318 A1* | 3/2015 | Merlin | H04L 47/12 370/336 |
| 2015/0245246 A1* | 8/2015 | Golitschek Edler von Elbwart | H04L 5/0094 370/280 |
| 2015/0365218 A1* | 12/2015 | Yang | H04L 5/0044 370/329 |
| 2016/0119969 A1* | 4/2016 | Vajapeyam | H04W 24/10 370/329 |
| 2016/0278081 A1* | 9/2016 | Chun | H04W 74/08 |
| 2017/0055181 A1* | 2/2017 | Tiirola | H04W 28/26 |

OTHER PUBLICATIONS

NTT DOCOMO et al., "Channel-Dependent Scheduling for E-UTRA Uplink," 3GPP Draft; R1-060323 UL Scheduling. 3rd Generation Partnership Project (3GPP). Mobile Competence Centre; 650, Route Des Lucioles ; F-06921 Sophia-Antipolis Cedex ; France. vol. RAN WG1. no. Denver. USA; Feb. 9, 2006. Feb. 9, 2006 (Feb. 9, 2006). XP050101270, 12 pages.

* cited by examiner

… (1)

UPLINK CONTROL RESOURCE ALLOCATION FOR DYNAMIC TIME-DIVISION DUPLEX SYSTEMS

CROSS-REFERENCE TO RELATED APPLICATION

The present application for patent claims priority to Provisional Application No. 62/077,112 entitled "UPLINK CONTROL RESOURCE ALLOCATION FOR DYNAMIC TIME-DIVISION DUPLEX SYSTEMS," filed Nov. 7, 2014, and assigned to the assignee hereof and hereby expressly incorporated by reference herein.

BACKGROUND

The present disclosure relates generally to communication systems, and more particularly, to an uplink control resource allocation methods and apparatuses in a wireless communications system.

Wireless communications systems are widely deployed to provide various telecommunication services such as telephony, video, data, messaging, and broadcasts. Typical wireless communications systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communications systems employing legacy LTE, a plurality of UEs served by a particular network entity (e.g., eNodeB) may receive control information from the eNodeB over a shared Physical Downlink Control Channel (PDCCH). The control information included in the PDCCH may include one or more uplink resource grants for UE transmission of uplink data in a future LTE uplink transmission window. When control information is to be transmitted by the UE in the uplink, however, it is often inefficient for the network entity to transmit dynamic grants for each uplink control information transmission. Furthermore, pre-allocating fixed resources (in time and frequency) without knowing a dynamic uplink transmission window length likewise leads to system inefficiencies.

As such, improvements in the uplink control resource allocation are needed to mitigate these present inefficiencies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various techniques are described in connection with example methods and apparatuses for managing user equipment communications in a wireless communications system.

For instance, the present disclosure presents an example method of managing uplink scheduling for one or more UEs served by a network entity in a wireless communications system. This example method may include generating, by the network entity, an uplink bandwidth allocation map, the uplink bandwidth allocation map defining an uplink bandwidth allocation for at least one of the one or more UEs for at least one of a plurality of uplink transmission window lengths. In addition, the example method may include transmitting the uplink bandwidth allocation map to at least one of the one or more UEs.

In a further aspect, the disclosure presents an example apparatus for managing uplink scheduling for one or more UEs served by a network entity in a wireless communications system. The example apparatus may include a processor, a memory in electronic communication with the processor, and instructions stored in the memory. In an aspect, the instructions may be executable by the processor to generate, by the network entity, an uplink bandwidth allocation map, the uplink bandwidth allocation map defining an uplink bandwidth allocation for at least one of the one or more UEs for at least one of a plurality of uplink transmission window lengths, and transmit the uplink bandwidth allocation map to at least one of the one or more UEs.

Additionally, the disclosure presents a further example apparatus for managing uplink scheduling for one or more UEs served by a network entity in a wireless communications system. In an aspect, the example apparatus may include means for generating, by the network entity, an uplink bandwidth allocation map, the uplink bandwidth allocation map defining an uplink bandwidth allocation for at least one of the one or more UEs for at least one of a plurality of uplink transmission window lengths. In addition, the example apparatus may include means for transmitting the uplink bandwidth allocation map to at least one of the one or more UEs.

In a further aspect, the disclosure presents a non-transitory computer-readable medium storing computer-executable code for managing uplink scheduling for one or more UEs served by a network entity in a wireless communication. The code may include instructions executable to generate, by the network entity, an uplink bandwidth allocation map, the uplink bandwidth allocation map defining an uplink bandwidth allocation for at least one of the one or more UEs for at least one of a plurality of uplink transmission window lengths and to transmit the uplink bandwidth allocation map to at least one of the one or more UEs.

Furthermore, the present disclosure describes a method for wireless communication that may be performed by a UE. The example method may include receiving, from a network entity, an uplink bandwidth allocation map, the uplink bandwidth allocation map defining an uplink bandwidth allocation for the UE for at least one of a plurality of uplink transmission window lengths. The method may further include storing the uplink bandwidth allocation map in a memory. Moreover, the method may include receiving, from the network entity and after receiving the uplink bandwidth allocation map, an uplink transmission window length from an uplink transmission window. In addition, the method may include querying the uplink bandwidth allocation map in the memory to determine the uplink bandwidth allocation corresponding to the received uplink transmission window length. The method may further include transmitting a control signal during the window length based on the uplink bandwidth allocation.

To the accomplishment of the foregoing and related ends, the one or more aspects are made up of the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
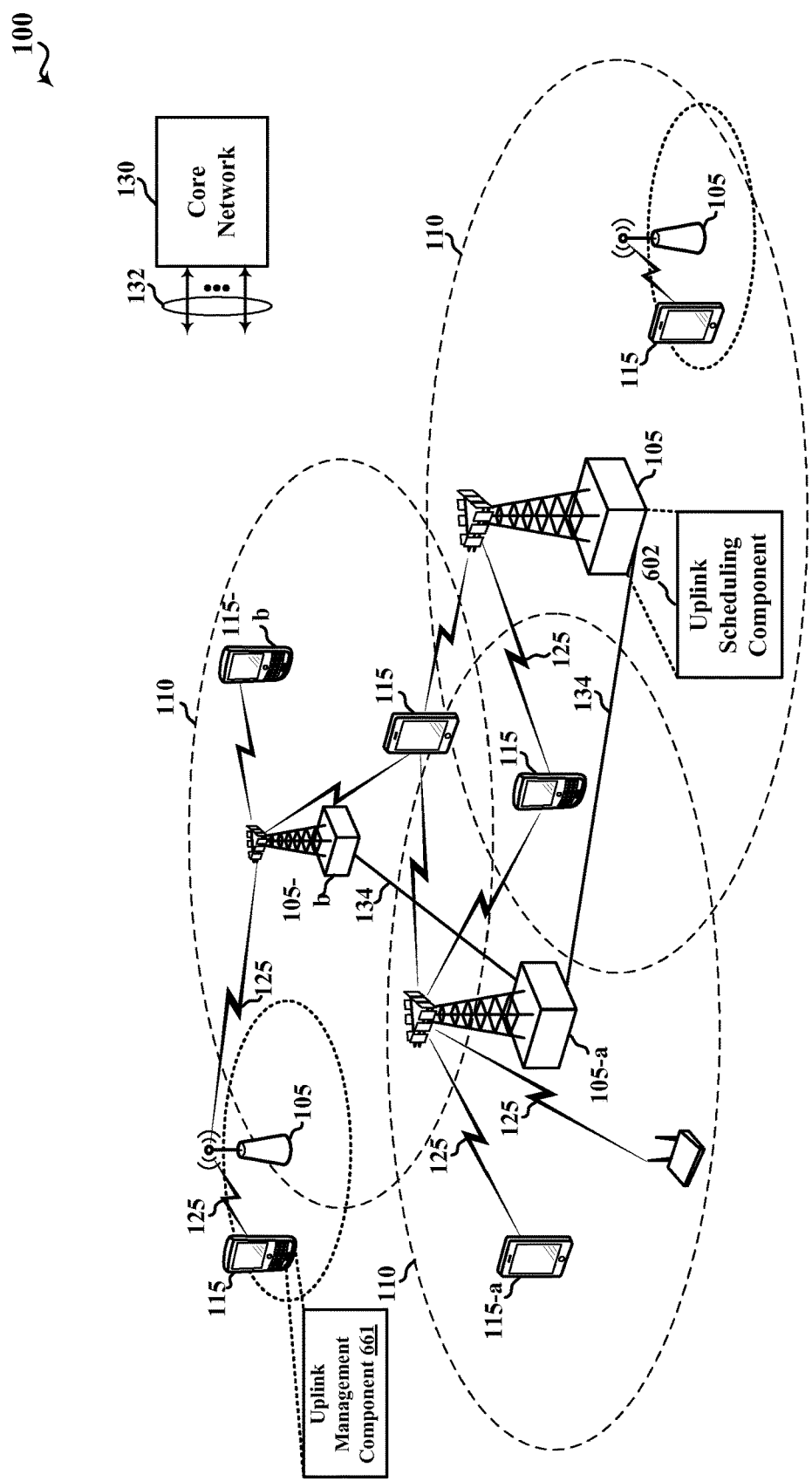
FIG. 1 shows a block diagram conceptually illustrating an example of a telecommunications system, in accordance with an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present disclosure presents example methods and apparatuses for managing resource allocation for uplink control transmissions. For example, in an aspect of the present disclosure, UEs may be assigned, via an uplink bandwidth allocation map (also referred to herein as "map"), a variable bandwidth resource that is a function of an uplink transmission window length specified by a serving network entity. In other words, a specific uplink bandwidth allocation for a UE may vary for each uplink transmission window based on the specified window length. In an aspect, this window length may vary over time. In other words, the window length may include one or more symbols that may be aggregated to form variable-sized transmission time intervals (TTIs) over time.

Furthermore, the network entity may generate and transmit the uplink bandwidth allocation map to each of its associated UEs, or to a subset of the UEs that may be scheduled with uplink transmissions, on a semi-static basis. In other words, rather than transmit the map for each uplink transmission window, the network entity may transmit the map on a periodic basis, where the periodicity of map transmission is less frequent than every window (e.g., once every 100 ms). Additionally, a latest-received map may be stored in a UE memory.

In addition, before each transmission window, the UE may receive, from the network entity, a transmission window length corresponding to each transmission window. The UE may then query the map stored in the UE memory to match the received transmission window length to a specific uplink bandwidth allocation for the transmission window. As such, uplink bandwidth may be allocated based on merely a transmission window length received on a per-transmission-window basis by the UE cross-referencing the received transmission window length with the stored uplink bandwidth allocation map, which may be updated by the network entity, transmitted to the UE, and stored in the UE memory on a semi-static basis.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, a number of user equipment (UEs) 115, and a core network 130. Access points 105 may include an uplink scheduling component 602 configured to control uplink bandwidth allocation of one or more UEs by generating and transmitting an uplink bandwidth allocation map to the one or more UEs on a semi-static basis. Similarly, one or more of UEs 115 may include an uplink management component 661 configured to periodically receive the uplink bandwidth allocation map and reference the map every uplink transmission window to determine the uplink bandwidth allocation based on a received uplink transmission window length. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-a may communicate with access point 105-a on both a first hierarchical layer that supports first layer transmissions with a first symbol type and a second hierarchical layer that supports second layer transmissions with a second symbol type. For example, access point 105-a may transmit symbols of the second symbol type that are time division duplexed with symbols of the first symbol type.

In some examples, hybrid UE 115-a may acknowledge receipt of a transmission by providing ACK/NACK for the transmission through, for example, a HARQ scheme. Acknowledgments from hybrid UE 115-a for transmissions in the first hierarchical layer may be provided, in some examples, after a predefined number of symbols following the symbol (or group of symbols) in which the transmission was received. The hybrid UE 115-a, when operating in the second hierarchical layer may, in examples, acknowledge receipt in a same symbol (or group of symbols) as the symbol (or group of symbols) in which the transmission was received. The time required to transmit an ACK/NACK and receive a retransmission may be referred to as round trip time (RTT), and thus symbols of the second symbol type may have a second RTT that is shorter than a RTT for symbols of the first symbol type.

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of symbols of the second symbol type. Access point 105-b may transmit symbols of the second symbol type exclusively, or may transmit one or more symbols of the first symbol type on the first hierarchical layer that are time division multiplexed with symbols of the second symbol type. Second layer UE 115-b, in the event that access point 105-b transmits symbols of the first symbol type, may ignore such symbols of the first symbol type. Thus, second layer UE 115-b may acknowledge receipt of transmissions in a same symbol (or group of symbols) as the symbol (or group of symbols) in which the transmissions are received. Thus, second layer UE 115-b may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more symbols each having a first symbol type using two or more separate carriers. Each carrier may have a bandwidth of, for example, 20 MHz, although other bandwidths may be utilized. Hybrid UE 115-*a*, and/or second layer UE 115-*b* may, in certain examples, receive and/or transmit one or more symbols in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
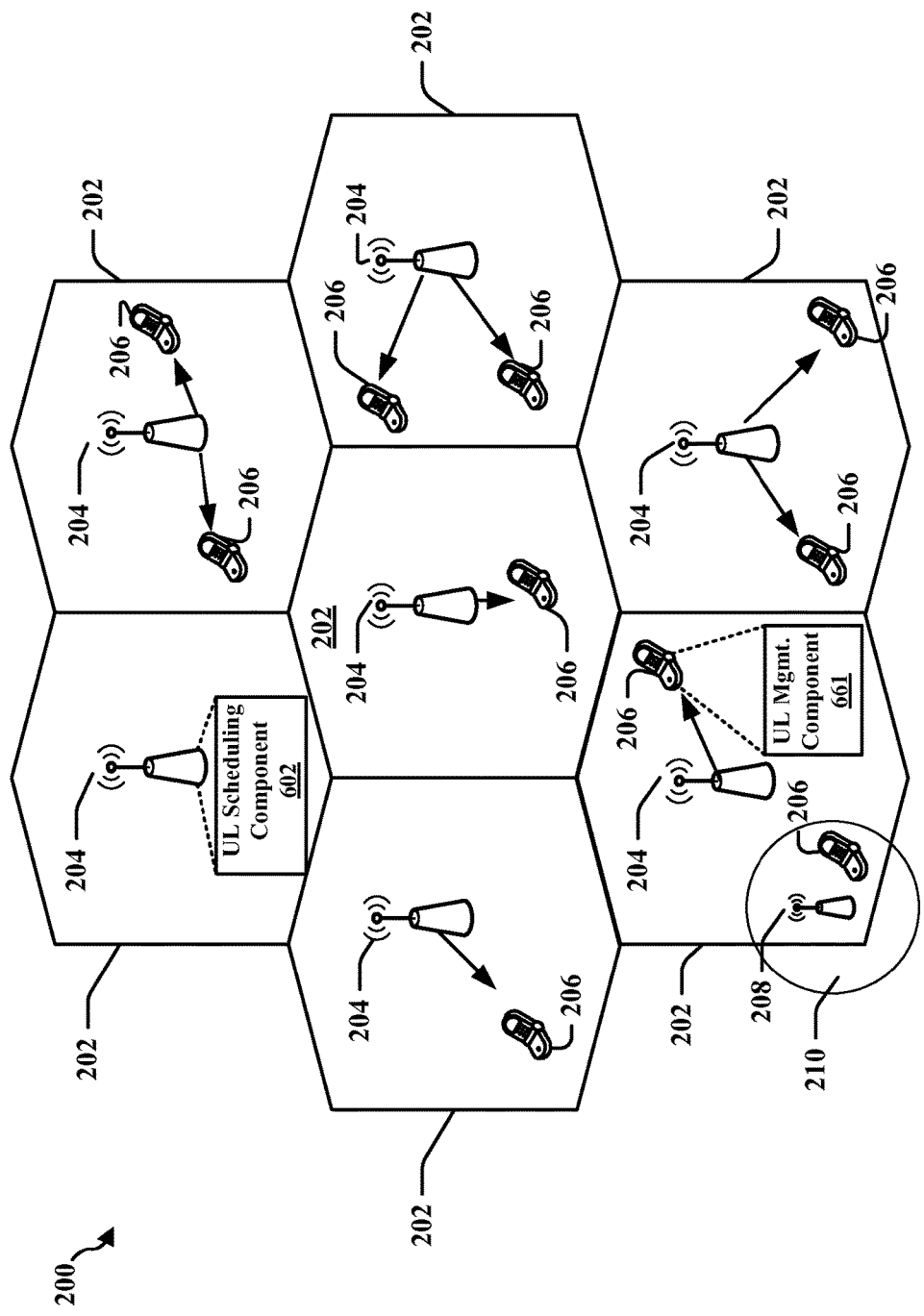
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the evolved packet core for all the UEs 206 in the cells 202. In an aspect, eNBs 204 may include an uplink scheduling component 602 configured to control uplink bandwidth allocation of one or more UEs by generating and transmitting an uplink bandwidth allocation map to the one or more UEs on a semi-static basis. Similarly, one or more of UEs 206 may include an uplink management component 661 configured to periodically receive the uplink bandwidth allocation map and reference the map every uplink transmission window to determine the uplink bandwidth allocation based on a received uplink transmission window length. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
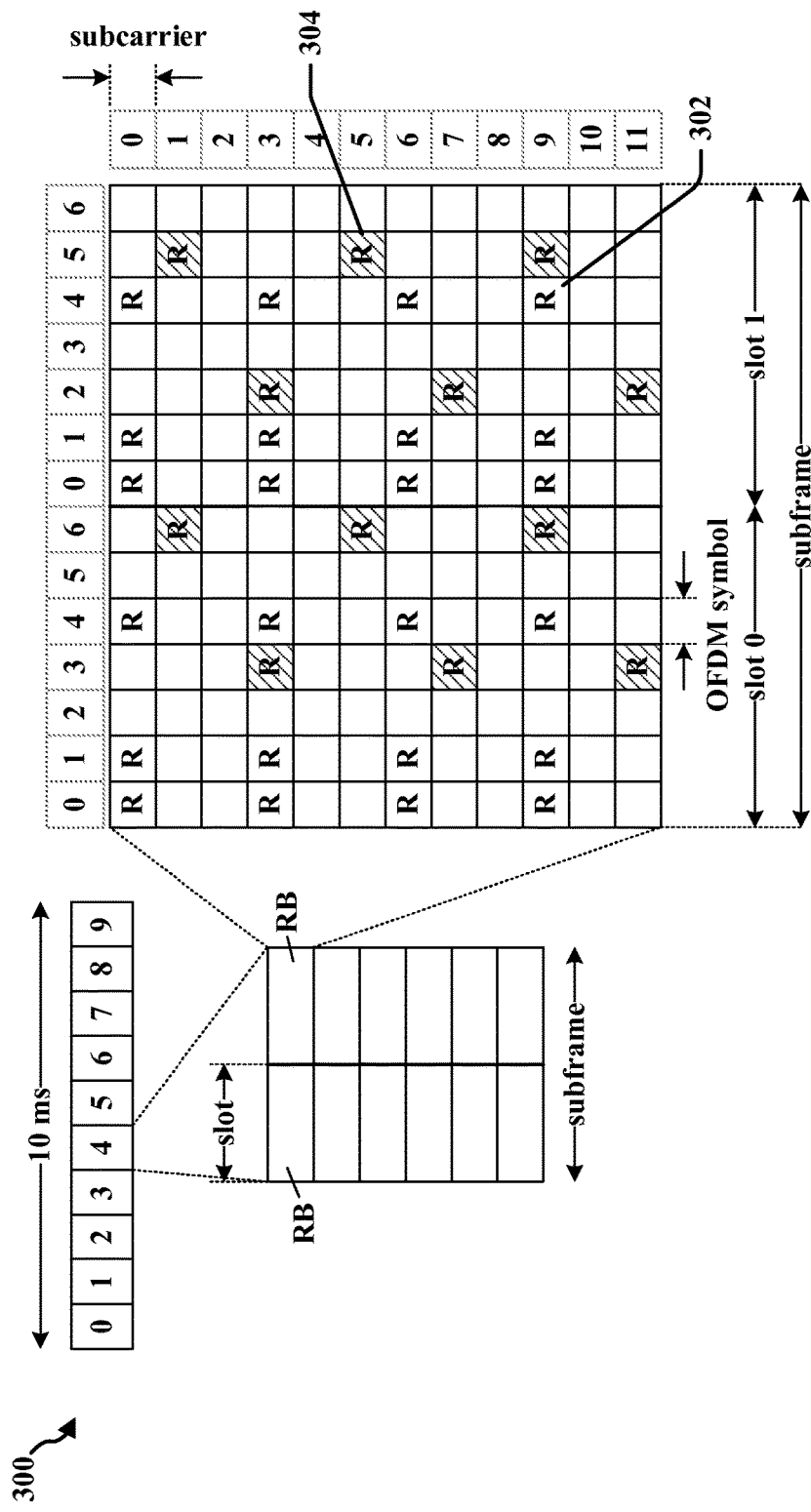
FIG. 3 is a diagram illustrating an example of a DL frame structure in LTE.

FIG. 3 is a diagram 300 illustrating an example of a DL frame structure in LTE, which, in some examples, may be utilized in conjunction with the downlink frame structure provided by the present disclosure. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
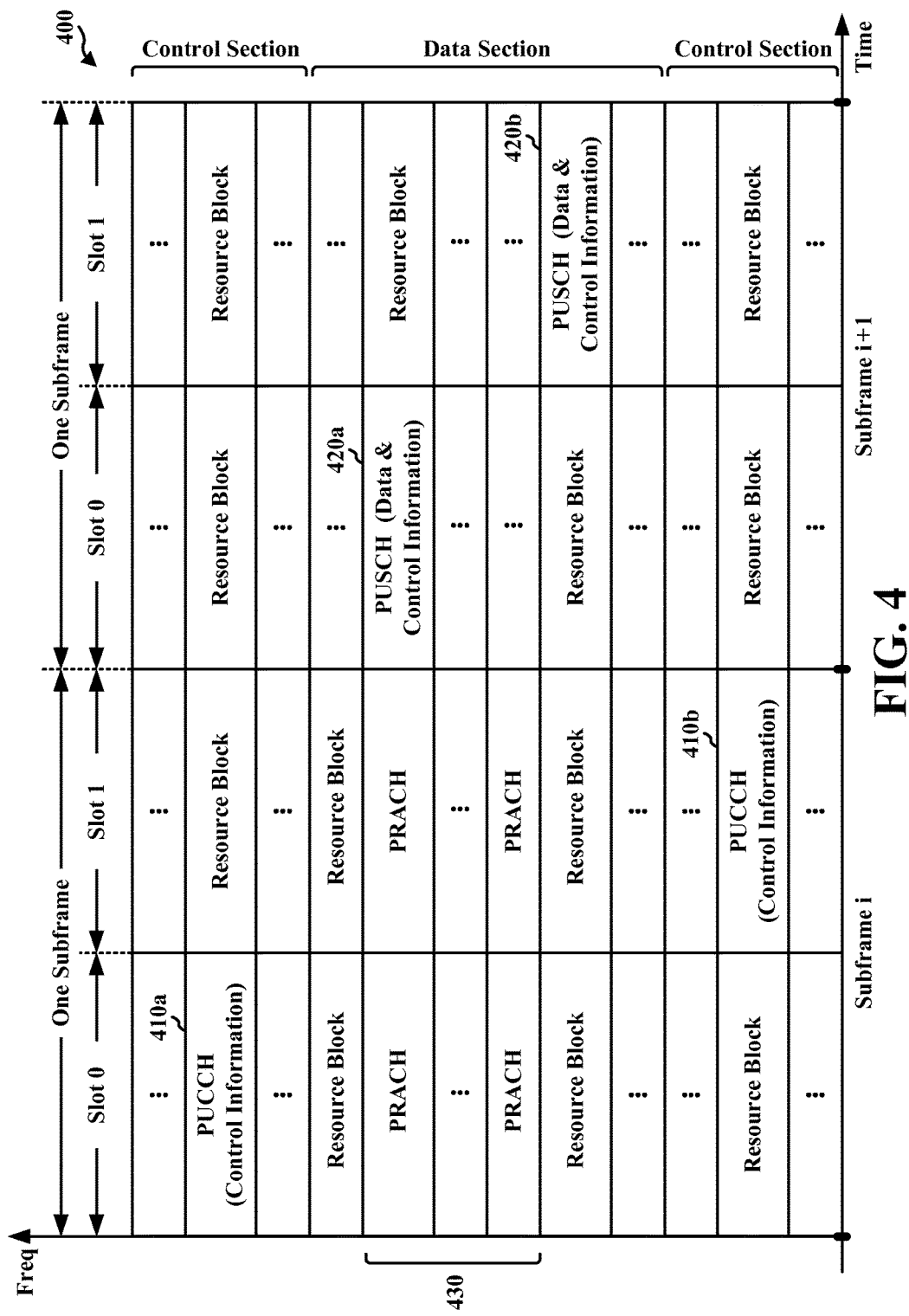
FIG. 4 is a diagram illustrating an example of an UL frame structure in LTE.

FIG. 4 is a diagram 400 illustrating an example of an UL frame structure in LTE. The available resource element blocks for the UL may be partitioned into a data section and a control section. The control section may be formed at the two edges of the system bandwidth and may have a configurable size. The resource element blocks in the control section may be assigned to UEs for transmission of control information, and, in an aspect, may be assigned based on an uplink bandwidth allocation map that is transmitted to the UEs semi-statically. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b, which may vary based on a received transmission window length, in the control section to transmit control information to an eNB, for example, according to an uplink bandwidth allocation map. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span multiple symbols or groups of symbols and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt may carried in a single symbol or in a sequence of few contiguous symbols and, in some examples, a UE can make only a single PRACH attempt in a specified time period (such as, but not limited to, per frame).

Figure 5:
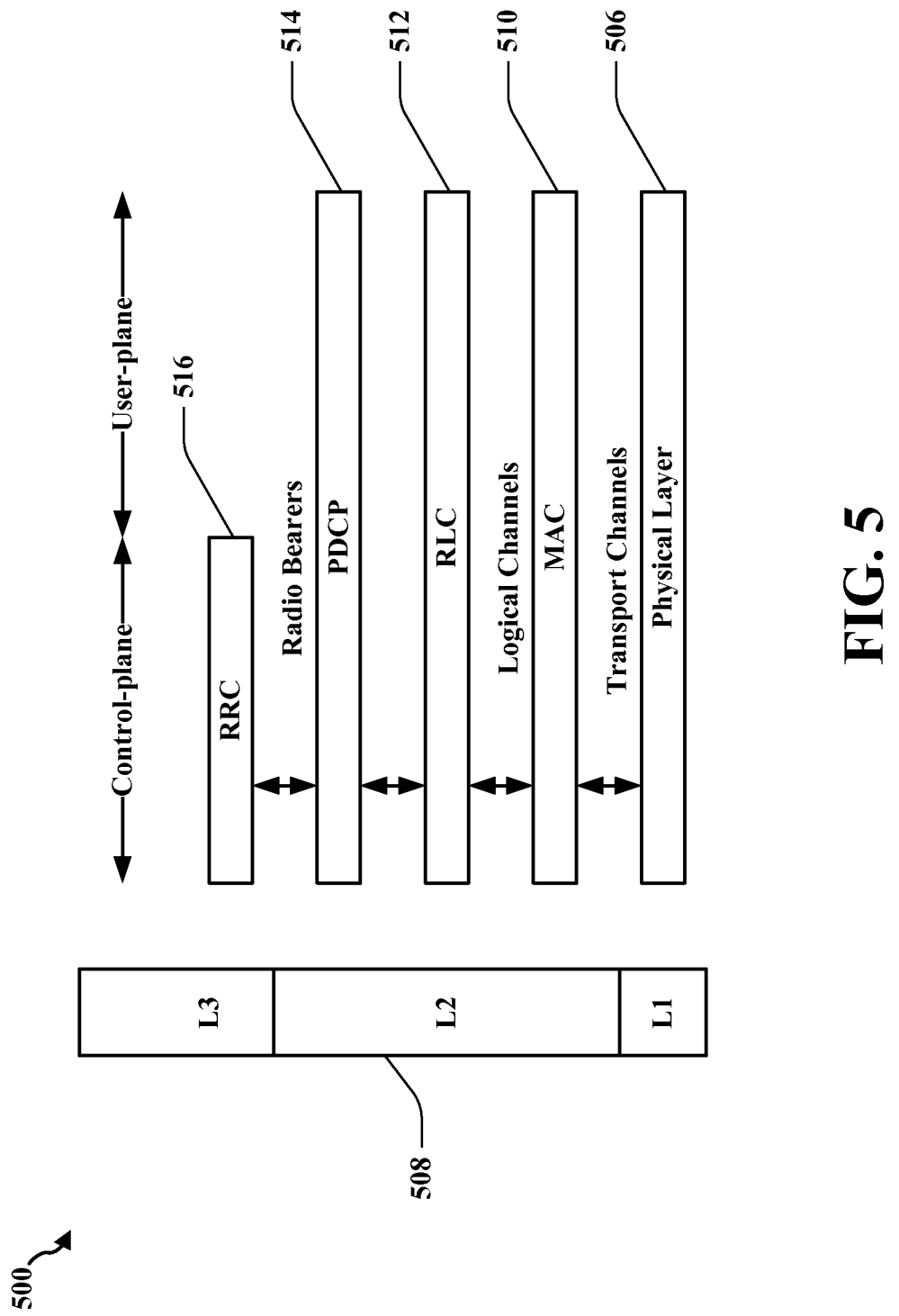
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
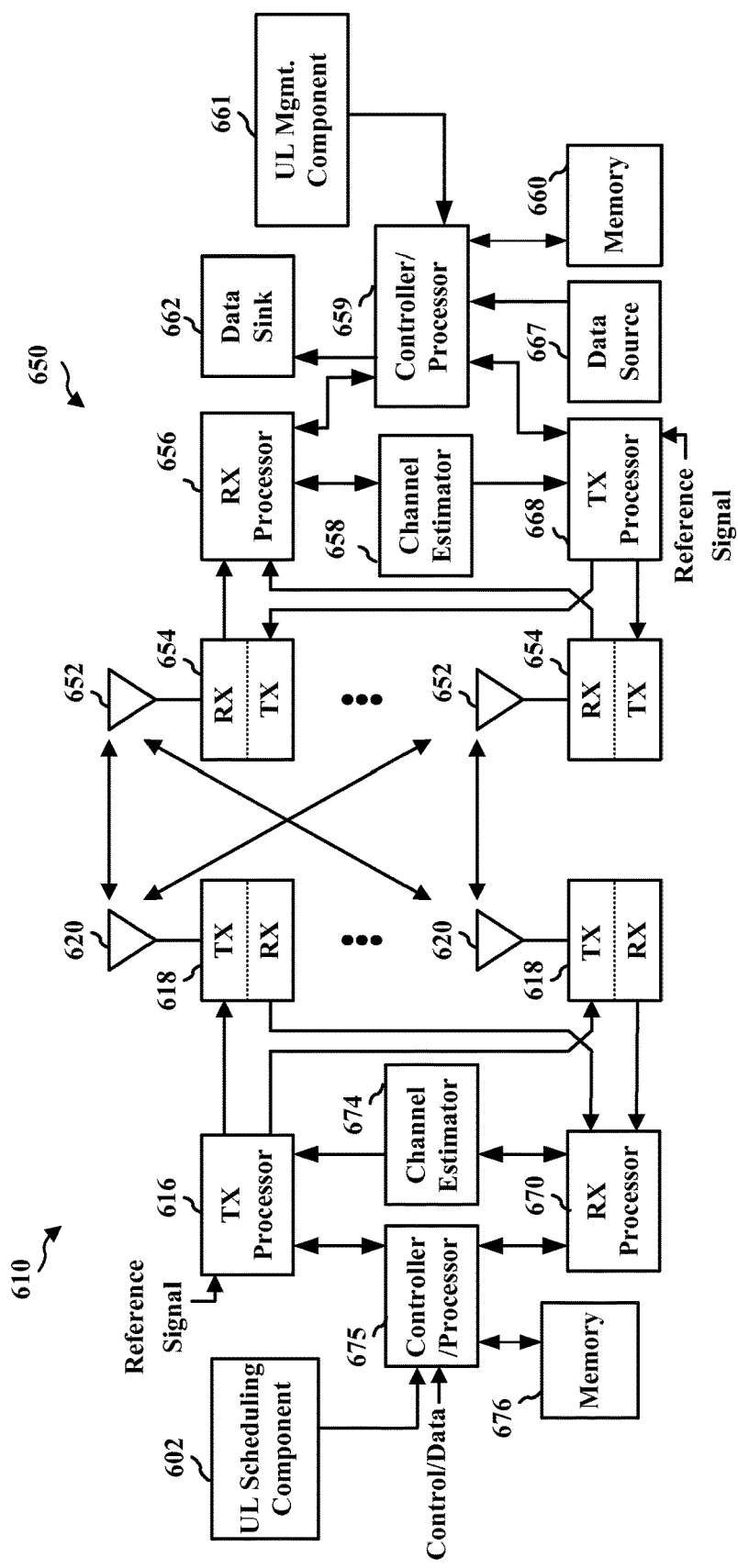
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include an uplink scheduling component 602 configured to control uplink bandwidth allocation of one or more UEs by generating and transmitting an uplink bandwidth allocation map to the one or more UEs on a semi-static basis.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal constitutes a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include an uplink management component 661 configured to periodically receive the uplink bandwidth allocation map and reference the map every uplink transmission window to determine the uplink bandwidth allocation based on a received uplink transmission window length.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
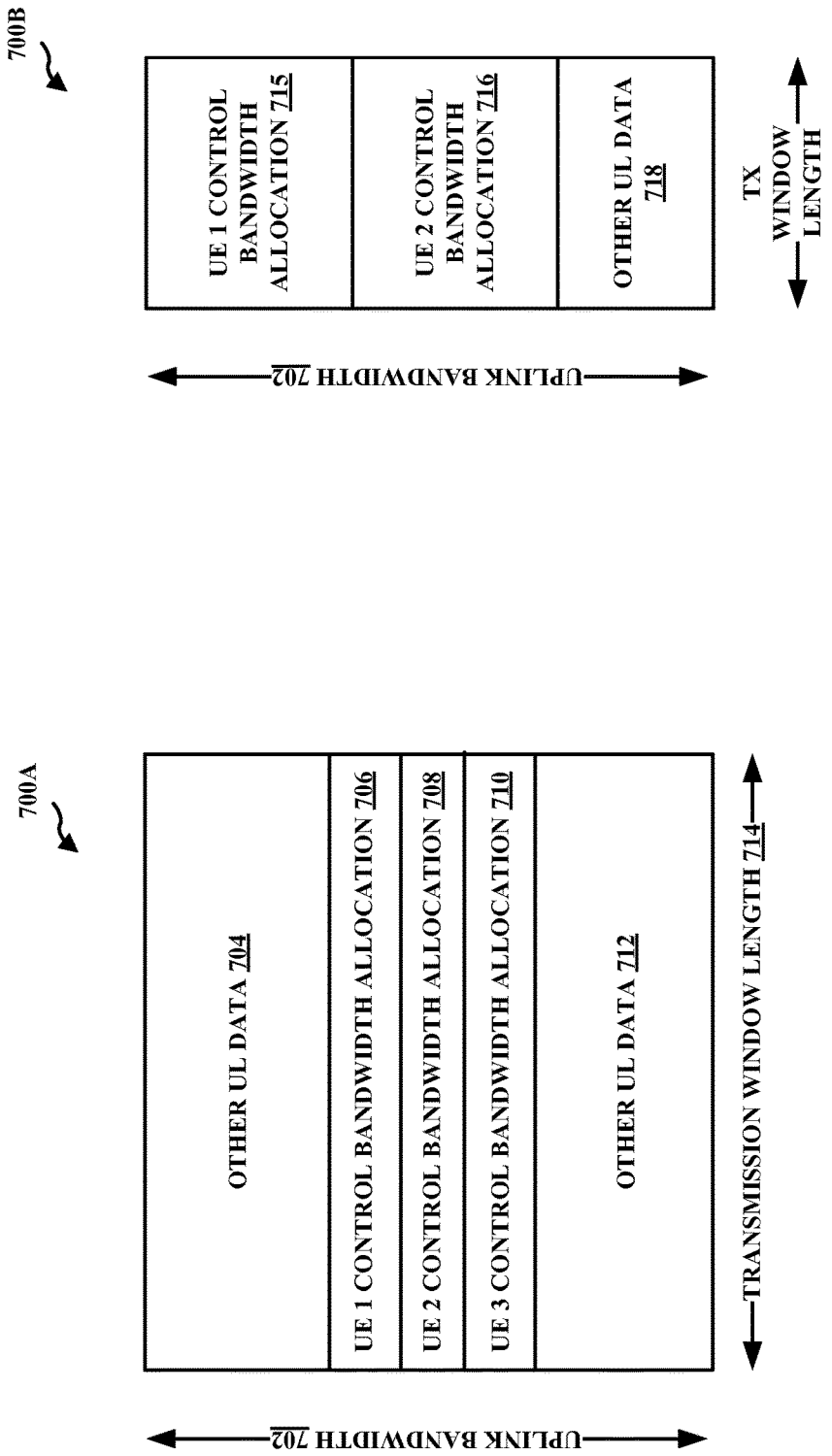
FIG. 7A is a diagram illustrating an example uplink bandwidth allocation map for uplink bandwidth allocation according to the present disclosure.
FIG. 7B is a diagram illustrating an example uplink bandwidth allocation map for uplink bandwidth allocation according to the present disclosure.

FIGS. 7A and 7B illustrate non-limiting examples of uplink bandwidth allocations 700A and 700B, respectively, for two separate uplink transmission windows having unique transmission window lengths 714 and 720, respectively. These uplink bandwidth allocations 700A and 700B may be included in an uplink bandwidth allocation map, which may be generated and transmitted to one or more UEs periodically and on a semi-static basis (e.g., less frequently than every transmission window). In an aspect, the uplink bandwidth allocations 700A and 700B contain UE-specific bandwidth allocation for an uplink channel based on a respective transmission window length. In other words, each uplink bandwidth allocation map may include bandwidth allocations for each of (or a subset of) a plurality of UEs served by the network entity for each of a plurality of transmission window lengths. In some examples, the uplink bandwidth allocation maps transmitted to separate UEs may contain unique bandwidth allocations for given UL window lengths such that an uplink bandwidth allocation map transmitted to a first UE may be different than an uplink bandwidth allocation map transmitted to a second UE. As such, the UL window length-to-UE uplink bandwidth allocation information that is included in the uplink bandwidth allocation map transmitted to each UE may potentially be different from one or more other UEs for the same window length, allowing for unequal bandwidth allocation, if needed. In an aspect, each of these transmission window lengths may include a unique number of symbols that may be aggregated to form the plurality of transmission window lengths, which may each have a unique TTI. For example, in FIG. 7A, an uplink bandwidth allocation is presented for a transmission window having a transmission window length 714. Likewise, FIG. 7B depicts an uplink bandwidth allocation for a transmission window having a transmission window length 720, which is shorter than transmission window length 714.

According to an aspect of the present disclosure, a transmission window length (e.g., 714 or 720) may be transmitted on a per-transmission-window basis (i.e., more frequently than the uplink bandwidth allocation map transmission periodicity), and may inform each UE of the transmission window length of a subsequent (e.g., a next) transmission window. Based on this transmission window length, a UE may look up its uplink bandwidth allocation corresponding to the transmission window length in a most recently received uplink bandwidth allocation map, which may be stored in a UE memory. Then, during the next transmission window, the UE may utilize the resources indicated in the corresponding uplink bandwidth allocation to transmit control data on the uplink. In an aspect, such control information may include, but is not limited to acknowledgement (ACK) messages, not acknowledged (NACK) messages, channel quality information (CQI), or any other control information.

As shown in FIG. 7A, an uplink bandwidth corresponding to a shared uplink channel (e.g., a physical uplink control channel (PUCCH)) may be allocated between uplink data allocations and uplink control information allocations. For example, other UL data 704 and 712 may correspond to uplink data transmission allocations that may be allocated based on an explicit uplink grant carried on a physical downlink control channel (PDCCH). In addition, uplink bandwidth allocation 700A includes control bandwidth allocations for three UEs that are dependent upon the transmission window length 714. These allocations include UE 1 control bandwidth allocation 706, UE 2 control bandwidth allocation 708, and UE 3 control bandwidth allocation 710. As illustrated in FIG. 7A, each of these UE-specific and transmission-window-length dependent control bandwidth allocations are mapped to unique bandwidth range, resource elements, or resource element groups within the uplink bandwidth 702. In other words, based on the transmission window length 714 alone, a UE 1, UE 2, and UE 3 are able to query the uplink bandwidth allocation map to determine their unique bandwidth allocations.

Furthermore, as is clear based on a comparison of the bandwidth allocations of FIG. 7A and those of FIG. 7B, when the transmission window length received from the network entity changes, so may the unique bandwidth allocation for each UE. For example, if transmission window length 720 is received by each of the UEs served by the network entity (e.g., subsequent to the transmission window of FIG. 7A), UE 1, UE 2, and UE 3 may again query the uplink bandwidth allocation map to look up the unique bandwidth allocations of each UE corresponding to transmission window length 720, which has a shorter duration vis-à-vis transmission window length 714. As illustrated in uplink bandwidth allocation 700B, UE 1 can determine that its uplink control bandwidth allocation corresponds to UE 1 control bandwidth allocation 715, UE 2 can determine that its uplink control bandwidth allocation corresponds to UE 2 control bandwidth allocation 716, and UE 3 may determine that no uplink bandwidth allocation exists for this particular transmission window. In addition, like uplink bandwidth allocation 700A, uplink bandwidth allocation 700B may include bandwidth granted to other UL data 718, for example, in a previous PDCCH allocation.

In an additional aspect, although the UE-specific uplink bandwidth allocations of FIGS. 7A and 7B are contiguous (i.e., each UE has a single contiguous bandwidth allocation), any UE may have multiple discontinuous bandwidth allocations (i.e., a plurality of discontinuous bandwidth ranges) in a transmission window. For example, a network entity may allocate a plurality of bandwidth regions to UE 1, and the plurality of bandwidth regions may be separated by allocations (e.g., data grants or other uplink control bandwidth allocations) to other UEs. In some examples, the UE's bandwidth allocation may take an interlaced resource block structure which spans a wide bandwidth occupying one resource block in a set of N resource blocks.

In addition, a single time-frequency resource of uplink bandwidth may be allocated to multiple UEs for uplink control transmission in a single transmission window. To facilitate this example aspect, code division multiplexing (CDM) may be utilized. In other words, each UE may be assigned a particular code such that the uplink transmissions of the time-frequency resource allocation may be code division multiplexed using the UE-specific codes that are orthogonal to one another. Furthermore, OFDM numerology may favor code division multiplexing in this fashion over time (e.g., splitting the time window amongst multiple UEs), over frequency (e.g., splitting the bandwidth allocation amongst multiple UEs), or both. In addition, where an uplink transmission window is relatively long in duration and/or the uplink channel is coherent in time, CDM in time may be preferred over CDM in frequency. Alternatively, where the uplink transmission window is relatively short in time and/or the uplink channel is coherent in frequency, CDM in frequency may be preferred over CDM in time.

In an additional aspect, a determination as to whether to utilize code division multiplexing may be based on operating conditions, design numerology, or the like. For example, where a particular network entity is serving a relatively large number of UEs that must transmit control data, the network entity may determine that code division multiplexing is to be utilized. Rules pertaining to the use of code division multiplexing (e.g., whether CDM is to be used, which codes are assigned to which UEs, and the like) may be generated and transmitted to the UEs via an uplink bandwidth allocation map.

Figure 8:
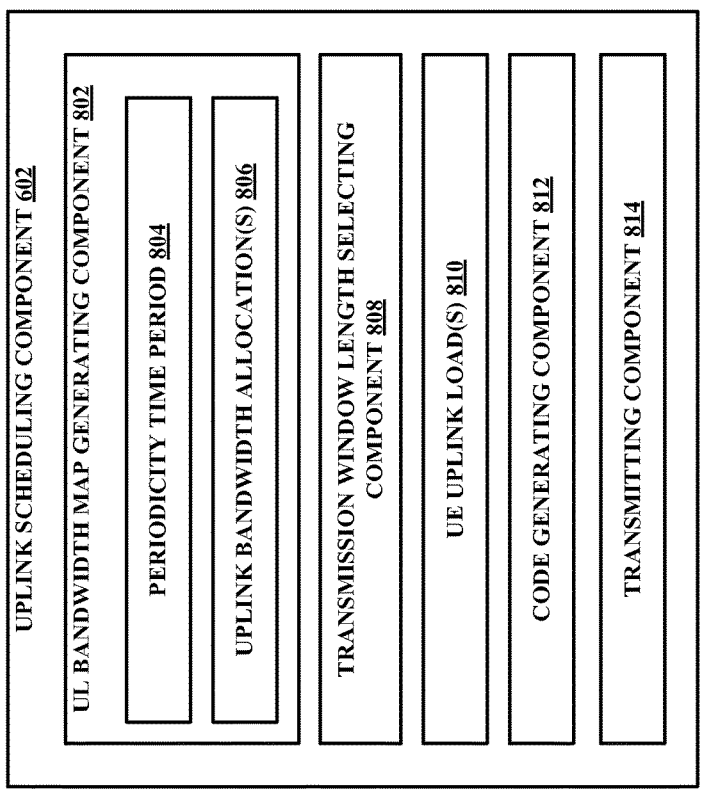
FIG. 8 is a diagram illustrating an uplink scheduling component configured to implement aspects of the present disclosure.

FIG. 8 is a block diagram containing a plurality of sub-components of an uplink scheduling component 602 (see FIG. 6), which may be implemented by a network entity (e.g., an eNodeB) for allocating uplink bandwidth resources (e.g., on a semi-static basis), for example, to reduce control overhead in an LTE system. Uplink scheduling component 602 may include an uplink bandwidth allocation map generating component 802, which may be configured to generate an uplink bandwidth allocation map, which may define uplink bandwidth allocations 806 for at least one of the one or more UEs for each of a plurality of uplink transmission window lengths. Furthermore, uplink bandwidth allocation map generating component 802 may generate an uplink bandwidth allocation map periodically as defined by a periodicity time period 804 (e.g., a frequency of generation). In an aspect, the periodicity time period 804 may be longer than a single transmission window length, such that uplink bandwidth allocations for a plurality of transmission windows are governed by the map. In other words, the periodicity time period 804 may define the semi-static timing of the generation (and subsequent transmission by transmitting component 814) of uplink bandwidth allocation maps. In some examples, for instance, the periodicity time period may be about 100 ms, though this is not a limiting example time period.

In addition, uplink scheduling component 602 may include a transmission window length selecting component 808, which may be configured to select an uplink transmission window length for each uplink transmission window. In some examples, the uplink transmission window length may be selected based at least in part on a number of the one or more UEs associated with or served by the network entity. Alternatively or additionally, the uplink transmission window length may be selected based at least in part on a UE uplink load 810 corresponding to the one or more UEs (which may be signaled to the network entity periodically by the UE or may be determined by the network entity, for example, based on an amount of recent downlink traffic requiring a corresponding ACK or NACK). When the transmission window length is selected, transmitting component 814 may transmit the selected transmission window length to the UEs, for example, via an RRC signaling message during each transmission window (e.g., on a per-transmission-window basis).

In addition, the selected uplink transmission window length may be transmitted by transmitting component 814 to at least one of the plurality of UEs before the uplink transmission window whose length is selected by the transmission window length selecting component. For example, the transmitting component 814 may transmit the selected transmission window length to each of the UEs during a preceding transmission or receiving window such that each UE is able to query the uplink bandwidth allocation map stored in its memory to determine its unique uplink bandwidth allocation based on the selected transmission window length.

In addition, uplink scheduling component 602 may include a code generating component 812, which may be configured to determine that a plurality of the one or more UEs are to share a bandwidth according to the uplink bandwidth allocation map. Based on such a determination, the code generating component 812 may generate a unique code (e.g., CDM code) for each of the plurality of the one or more UEs. As such, code generating component 812 enables code division multiplexing of uplink transmissions by at least one of the plurality of UEs that may share a time-frequency resource allocation. In addition, transmitting component 814 may be configured to transmit the unique code to at least one of the plurality of UEs, for example, in a stand-alone signaling message or as part of an uplink bandwidth allocation map.

Figure 9:
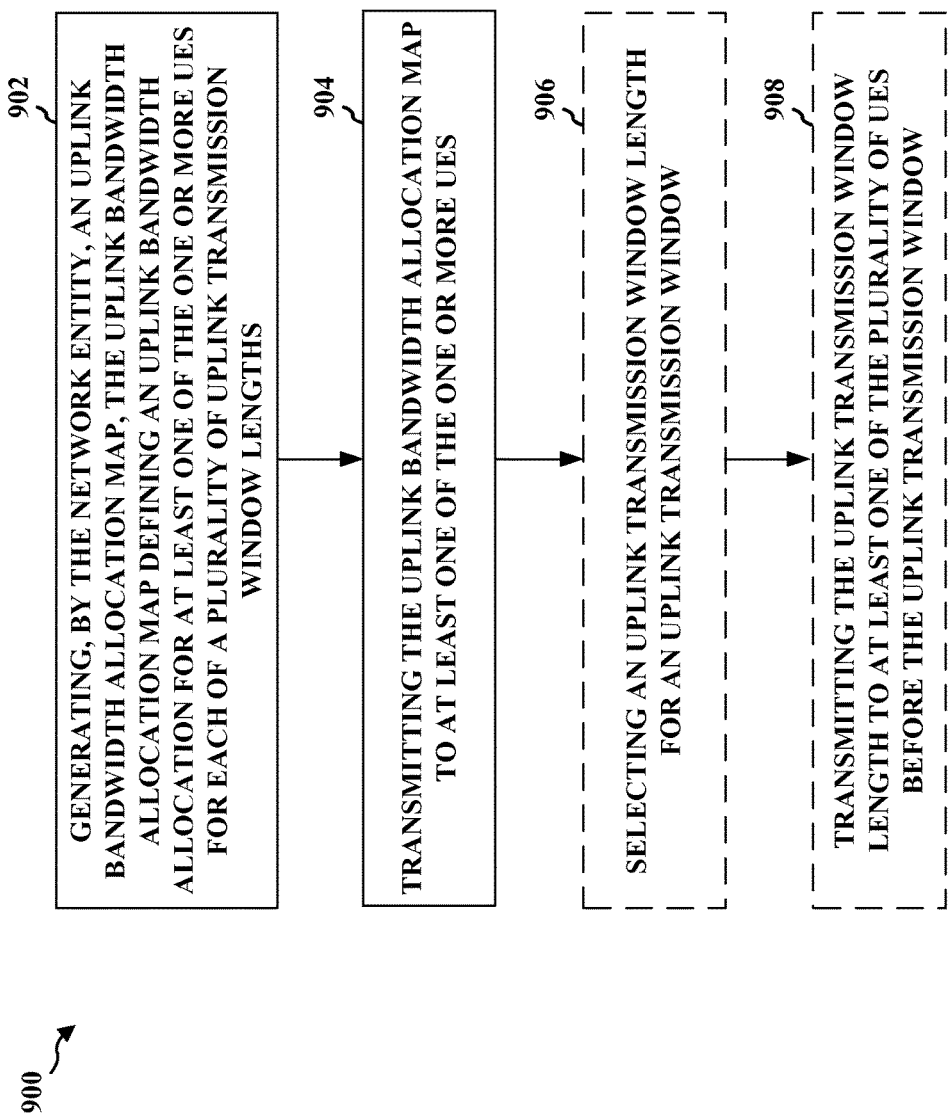
FIG. 9 is a flow chart of a method of uplink bandwidth allocation.

FIG. 9 illustrates an example method 900 of the present disclosure, which may be performed by a network entity (e.g., an eNodeB) or a component of the network entity, such as, but not limited to, uplink scheduling component 602 of FIG. 6 and FIG. 8. For example, in an aspect, at block 902, method 900 may include generating, by the network entity, an uplink bandwidth allocation map. In an aspect, the uplink bandwidth allocation map may define an uplink bandwidth allocation for each of one or more UEs served by the network entity for each of a plurality of uplink transmission window lengths. In some examples, each uplink bandwidth allocation map may be unique to a UE or a subset of the one or more UEs served by the network entity. As such, a first uplink bandwidth allocation map transmitted to a first UE may contain different uplink bandwidth allocations for the individual uplink transmission window lengths relative to a second uplink bandwidth allocation map transmitted to a second UE. In an aspect, block 902 may be performed by uplink bandwidth allocation map generating component 802 of FIG. 8.

In addition, method 900 may include, at block 904, transmitting the uplink bandwidth allocation map to at least one of the one or more UEs. In an aspect, block 904 may be performed by transmitting component 814 of FIG. 8. Furthermore, generating and transmitting the uplink bandwidth allocation map at blocks 902 and 904 may occur periodically and according to a periodicity time period (which may be greater than a transmission window length).

Additionally, at block 906, in an optional aspect (as illustrated by the dotted lines of the block), method 900 may include selecting an uplink transmission window length for an uplink transmission window. In an aspect, block 906 may be performed by transmission window length selecting component 808 of FIG. 8. Furthermore, the uplink transmission window length may be selected based at least in part on a UE uplink load corresponding to the one or more UEs and/or a number of the one or more UEs associated with or served by the network entity.

In an additional optional aspect, method 900 may include, at block 908, transmitting the uplink transmission window length to at least one of the plurality of UEs before the uplink transmission window. Like block 904, block 908 may be performed by transmitting component 814 of FIG. 8. Furthermore, blocks 906 and 908 may be performed for each uplink transmission window.

In addition, although not explicitly shown in FIG. 9, method 900 may include one or more alternative or additional features. For example, method 900 may include determining that a plurality of the one or more UEs are to share a bandwidth according to the uplink bandwidth allocation map. In addition, method 900 may include generating a unique code for each of the plurality of the one or more UEs to enable code division multiplexing of uplink transmissions by at least one of the plurality of the one or more UEs. Likewise, method 900 may include transmitting the unique code to at least one of the plurality of the one or more UEs.

Figure 10:
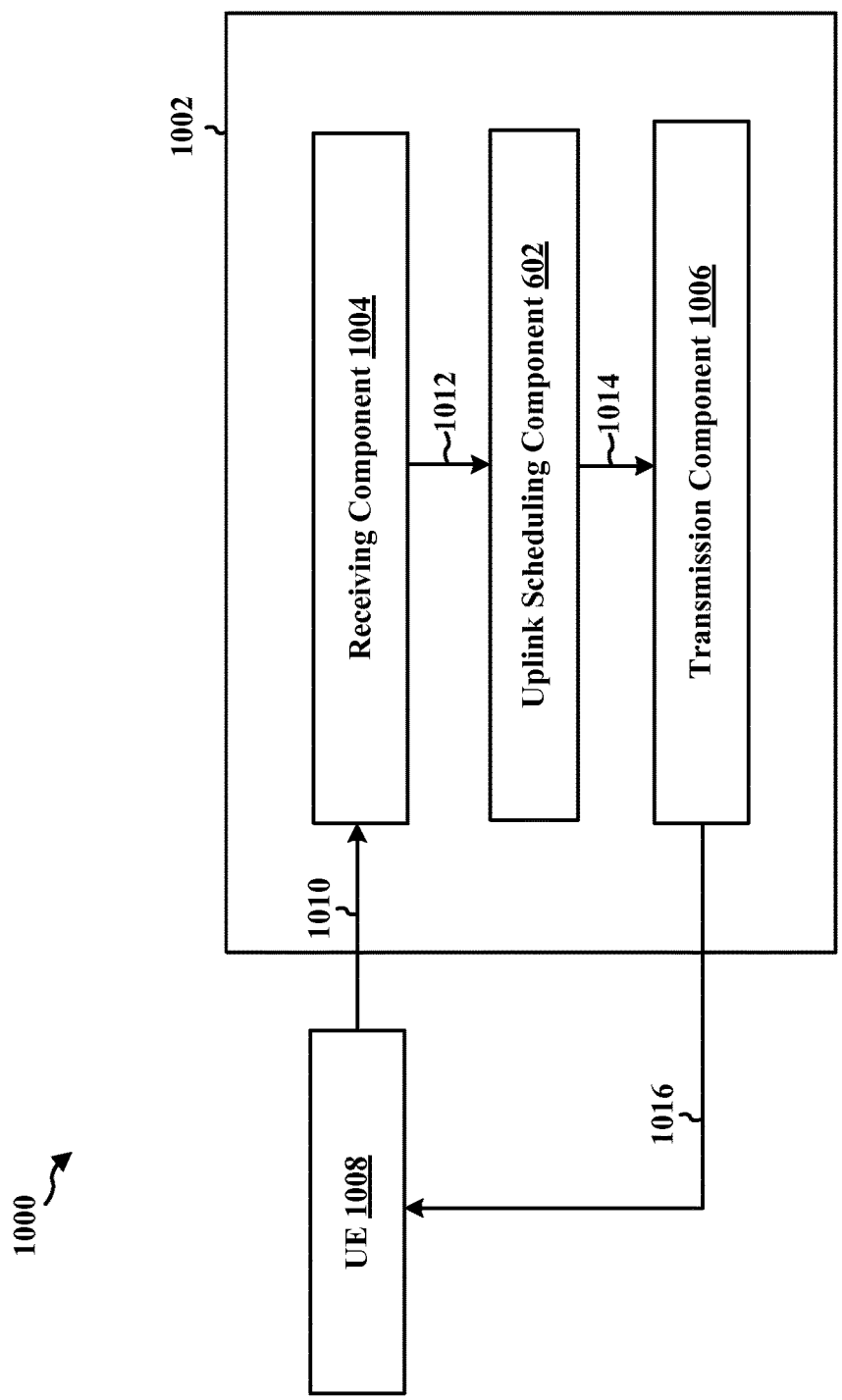
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus 1002 may be an eNodeB, which may include, but is not limited to, access point 105 of FIG. 1, macro eNB 204 or lower power class eNB 208 of FIG. 2, or eNB 610 of FIG. 6, any of which may include uplink scheduling component 602 (see, e.g., FIG. 8). The apparatus 1002 includes a receiving component 1004 that is configured to receive uplink data 1010 (e.g., sent to apparatus 1002 by a UE 1008, which may include, but is not limited to, UE 115 of FIG. 1, UE 206 of FIG. 2, or UE 650 of FIG. 6). The uplink data 1010 may include, but is not limited to, one or more control signals transmitted by the UE 1008. In addition, in some examples, the receiving component 1004 may be the transceiver 1110 or the antenna 1120 of FIG. 11.

In some instances, receiving component 1004 may forward the received control information 1012 to uplink scheduling component 602 (see, e.g., FIG. 6), which may be configured to generate an uplink bandwidth allocation map and select an uplink transmission window length for one or more UEs (including UE 1008). The uplink scheduling component 602 may forward the uplink bandwidth allocation map and/or the uplink transmission window length 1014 to a transmission component 1006 of apparatus 1002.

In an aspect, transmission component 1006 (which may correspond to transmitting component 814 of FIG. 8 or transceiver 1110 or antenna 1120 of FIG. 11) that is configured to transmit downlink data 1016 (which may include the uplink bandwidth allocation map and/or the uplink transmission window length) to one or more UEs, which may include UE 1008.

The apparatus 1002 may include additional modules that perform each of the steps of the method 900 in the aforementioned flow chart of FIG. 9. As such, each step in aforementioned method 900 of FIG. 9 may be performed by a particular component and the apparatus 1002 may include one or more of those components. The components may be one or more hardware components specifically configured to carry out the stated method 900 and its processes/algorithm, implemented by a processor configured to perform the stated processes/algorithm, stored within a computer-readable medium for implementation by a processor, or some combination thereof.

Figure 11:
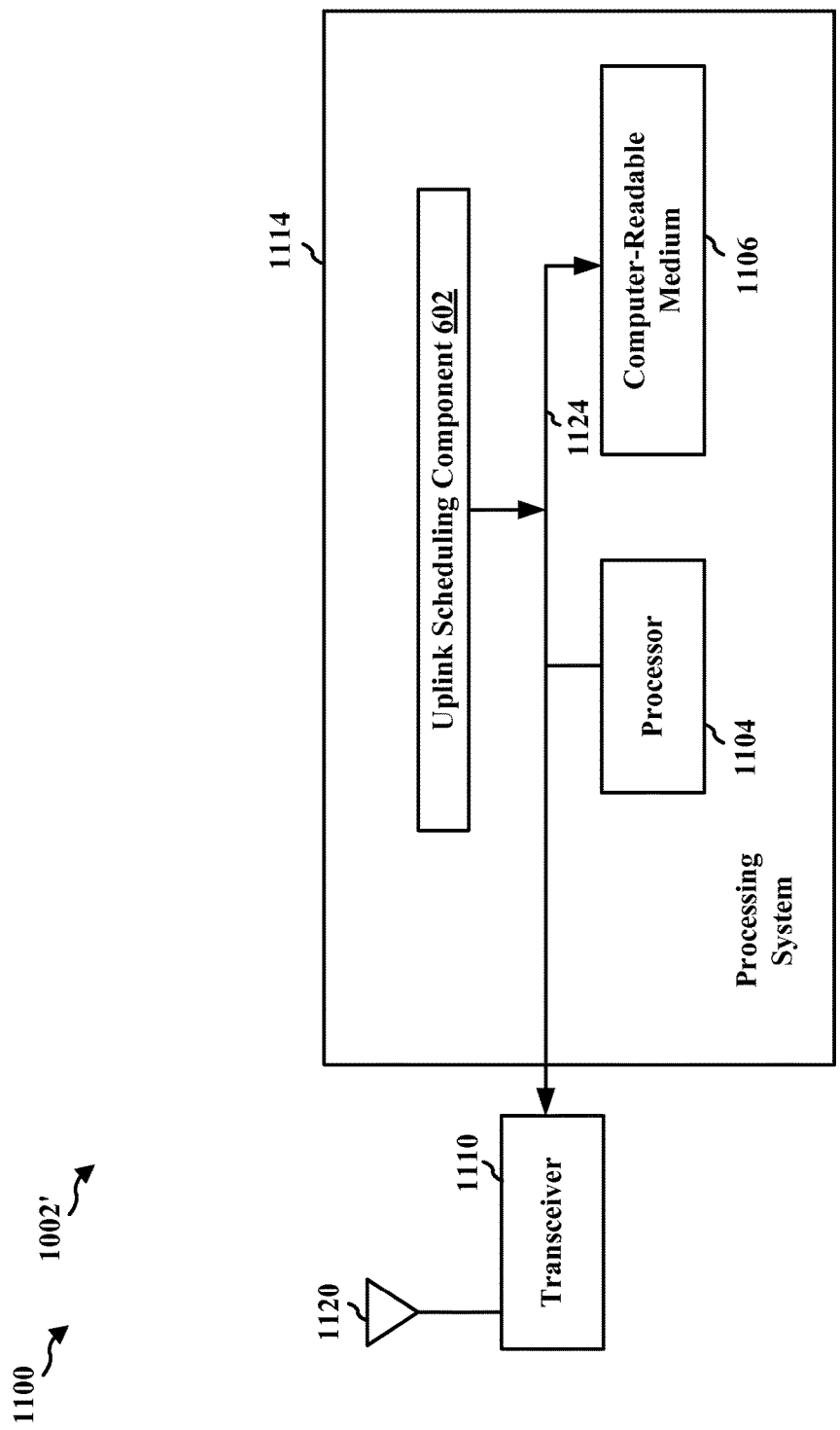
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. Like apparatus 1002 of FIG. 10, apparatus 1002' and/or processing system 1114 may be a network entity (e.g., access point 105 of FIG. 1, macro eNB 204 or lower power class eNB 208 of FIG. 2, eNB 610 of FIG. 6, or apparatus 1002 of FIG. 10). The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the uplink scheduling component 602 (see, e.g., FIG. 8), and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. In addition, the transceiver 1110 may be configured to transmit at least an uplink bandwidth allocation map and/or transmission window length to one or more UEs and may potentially include transmission component 1006 of FIG. 10 and/or transmitting component 814 of FIG. 8. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system 1114 may further include uplink scheduling component 602 (see, e.g., FIG. 8) and one or more of its subcomponents described in FIG. 8. The modules/components may be software modules running in the processor 1104, resident/stored in the computer-readable medium 1106, one or more hardware modules coupled to the processor 1104, or some combination thereof. The processing system 1114 may be a component of the eNB 610 and may include the memory 676 and/or at least one of the TX processor 616, the RX processor 670, and the controller/processor 675.

In one configuration, the apparatus 1002' for wireless communication includes means for generating, by the network entity, an uplink bandwidth allocation map, the uplink bandwidth allocation map defining an uplink bandwidth allocation for at least one of the one or more UEs for each of a plurality of uplink transmission window lengths; means for transmitting the uplink bandwidth allocation map to at least one of the one or more UEs; means for selecting an uplink transmission window length for an uplink transmission window; and means for transmitting the uplink transmission window length to at least one of the plurality of UEs before the uplink transmission window.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 12:
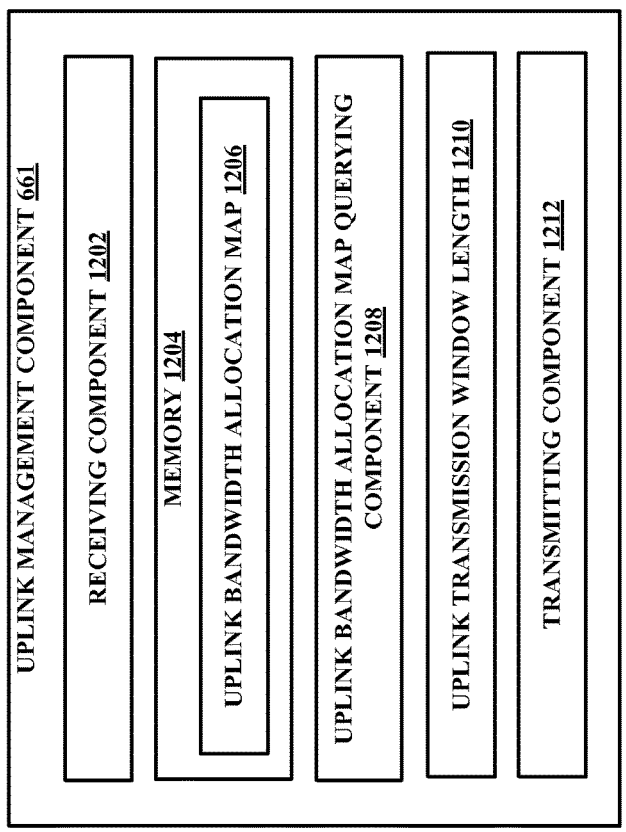
FIG. 12 is a diagram illustrating an uplink management component configured to implement aspects of the present disclosure.

FIG. 12 is a block diagram containing a plurality of sub-components of an uplink management component 661 (see FIG. 6), which may be implemented by a UE for managing uplink control transmission according to an uplink bandwidth allocation map and a transmission window length received from a network entity. In an aspect, uplink management component 661 may include a receiving component 1202, which may be configured to receive, from a network entity, an uplink bandwidth allocation map 1206. In an aspect, the uplink bandwidth allocation map 1206 may define an uplink bandwidth allocation for the UE for each of a plurality of uplink transmission window lengths. Furthermore, receiving component 1202 may be configured to receive, from the network entity and after receiving the uplink bandwidth allocation map 1206, an uplink transmission window length for an uplink transmission window, which may include a window at a subsequent time relative to the time the uplink transmission window length is received. Moreover, where CDM is to be utilized, receiving component 1202 may receive, from the network entity, a unique code for CDM implementation during an uplink transmission window.

In addition, uplink management component 661 may include a memory 1204, which may be configured to store the uplink bandwidth allocation map 1206 received by receiving component 1202. In an aspect, the memory 1204 may store the uplink bandwidth allocation map 1206 until a new uplink bandwidth allocation map is received, at which time the new uplink bandwidth allocation map may replace a currently stored uplink bandwidth allocation map.

Furthermore, uplink management component 661 may include an uplink bandwidth allocation map querying component 1208, which may be configured to query the uplink bandwidth allocation map 1206 in the memory 1204 to determine the uplink bandwidth allocation corresponding to the received uplink transmission window length 1210. Furthermore, uplink management component 661 may include a transmitting component 1212, which may be configured to transmit a control signal during the uplink transmission window length 1210 based on the uplink bandwidth allocation returned from the uplink bandwidth allocation map 1206.

Figure 13:
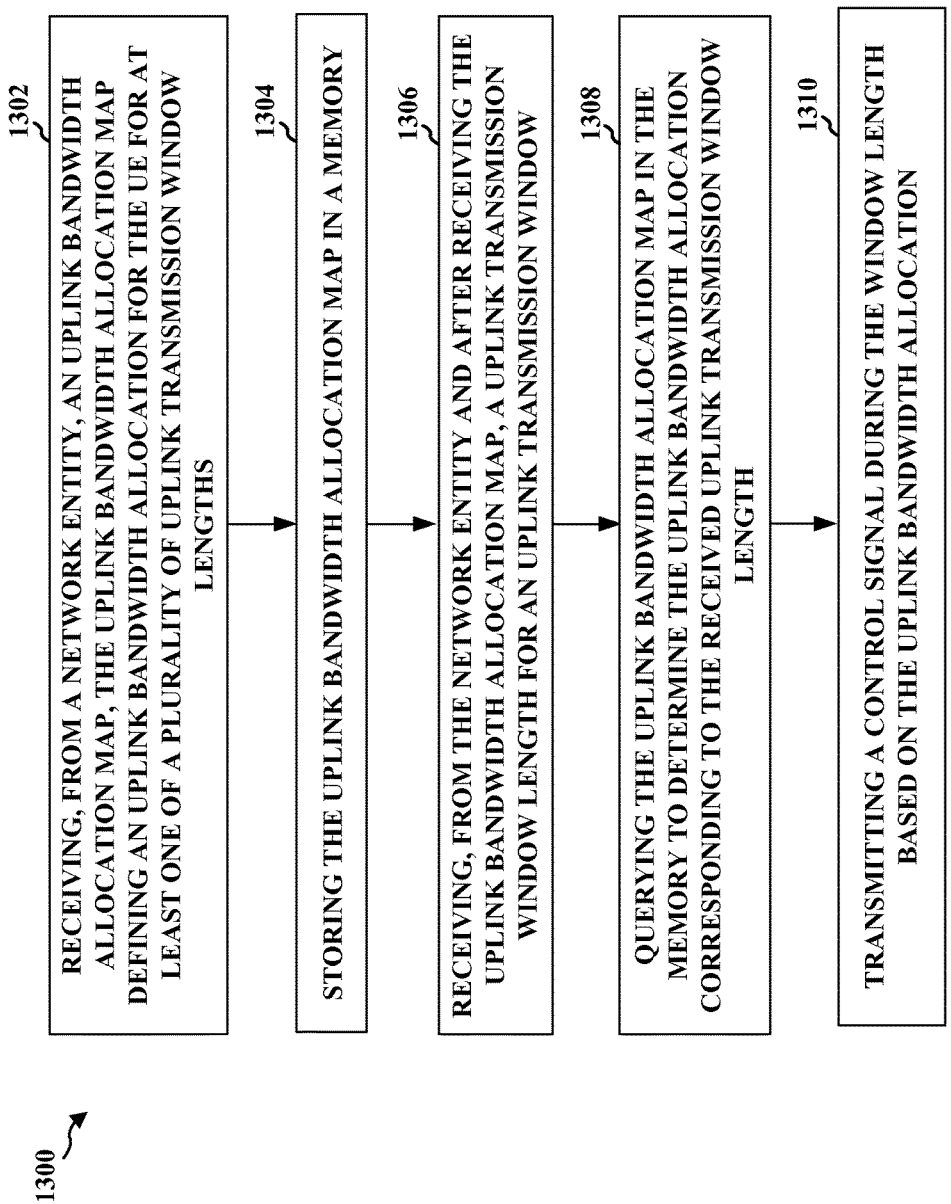
FIG. 13 is a flow chart of a method of uplink bandwidth management.

FIG. 13 illustrates an example method 1300 of the present disclosure, which may be performed by a UE or a component of the UE, such as, but not limited to, uplink management component 661 of FIG. 6 and FIG. 12. For example, in an aspect, at block 1302, method 1300 may include receiving, from a network entity, an uplink bandwidth allocation map. In an aspect, the uplink bandwidth allocation map may define an uplink bandwidth allocation for the UE for each of a plurality of uplink transmission window lengths. In an aspect, block 1302 may be performed by receiving component 1202 of FIG. 12.

Additionally, method 1300 may include, at block 1304, storing the uplink bandwidth allocation map in a memory (e.g., memory 1204 of FIG. 12). Moreover, method 1300 may include, at block 1306, receiving, from the network entity and after receiving the uplink bandwidth allocation map, an uplink transmission window length for an uplink transmission window. In an aspect, block 1306 may be performed by receiving component 1202 of FIG. 12.

Furthermore, at block 1308, method 1300 may include querying the uplink bandwidth allocation map in the memory to determine the uplink bandwidth allocation corresponding to the received uplink transmission window length. In an aspect, block 1308 may be performed by uplink bandwidth allocation map querying component 1208 of FIG. 12. Additionally, method 1300 may include, at block 1310, transmitting a control signal during the window length based on the uplink bandwidth allocation. In an aspect, the control signal may be an ACK, NACK, CQI, a bursty interference indicator, or any other control signal known to one of ordinary skill in the art. Moreover, block 1310 may be performed by transmitting component 1212 of FIG. 12.

In addition, although not explicitly shown in FIG. 13, method 1300 may include one or more alternative or additional features. For example, method 1300 may include receiving, from the network entity, a unique code for utilization in CDM scenarios. Furthermore, in an aspect, block 1310 may include transmitting the control signal using the code to effect CDM implementation in a shared time-frequency allocation.

Figure 14:
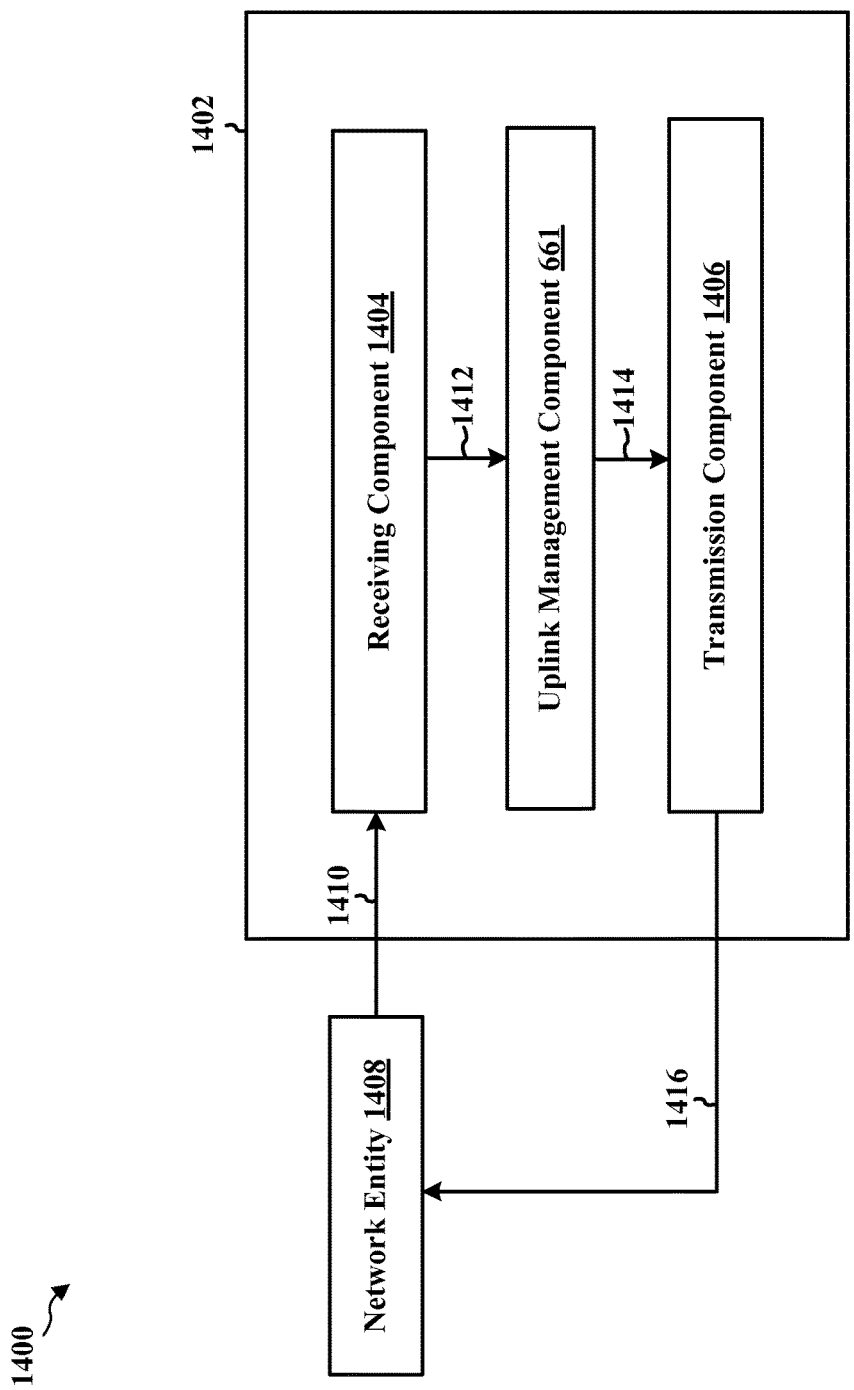
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. In some examples, the apparatus 1402 may be a UE (e.g., UE 115 of FIG. 1, UE 206 of FIG. 2, or UE 650 of FIG. 6). The apparatus includes a receiving component 1404 that is configured to receive data 1410 (e.g., sent to apparatus 1402 by network entity 1408, which may include one or more eNodeBs of the present disclosure). In some examples, receiving component 1404 may correspond to receiving component 1202 of FIG. 12 or transceiver 1510 or antennas 1520 of FIG. 15. In addition, the data 1410 may include, but is not limited to, an uplink bandwidth allocation map and/or an uplink transmission window length as described herein. The receiving component 1404 may be configured to forward the data 1412 to an uplink management component 661 (see, e.g., FIG. 12), which may be configured to utilize the data 1412 to perform aspects of method 1300 of FIG. 13. For instance, uplink management component 661 may be configured to store an uplink bandwidth allocation map in a memory and query the uplink bandwidth allocation map in the memory to determine the uplink bandwidth allocation corresponding to a received uplink transmission window length. In addition, uplink management component 661 may send data/messages 1414 (e.g., associated with one or more control signals 1416) to transmission component 1406.

Furthermore, apparatus 1402 may include a transmission component 1406 (which may correspond to transmitting component 1212 of FIG. 12 or transceiver 1510 or antennas 1520 of FIG. 15) that is configured to transmit one or more control signals 1416 to network entity 1408 using an uplink bandwidth allocation that is a function of transmission window length.

The apparatus may include additional modules that perform each of the steps of the algorithm in the aforementioned flow chart of FIG. 13. As such, each step in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
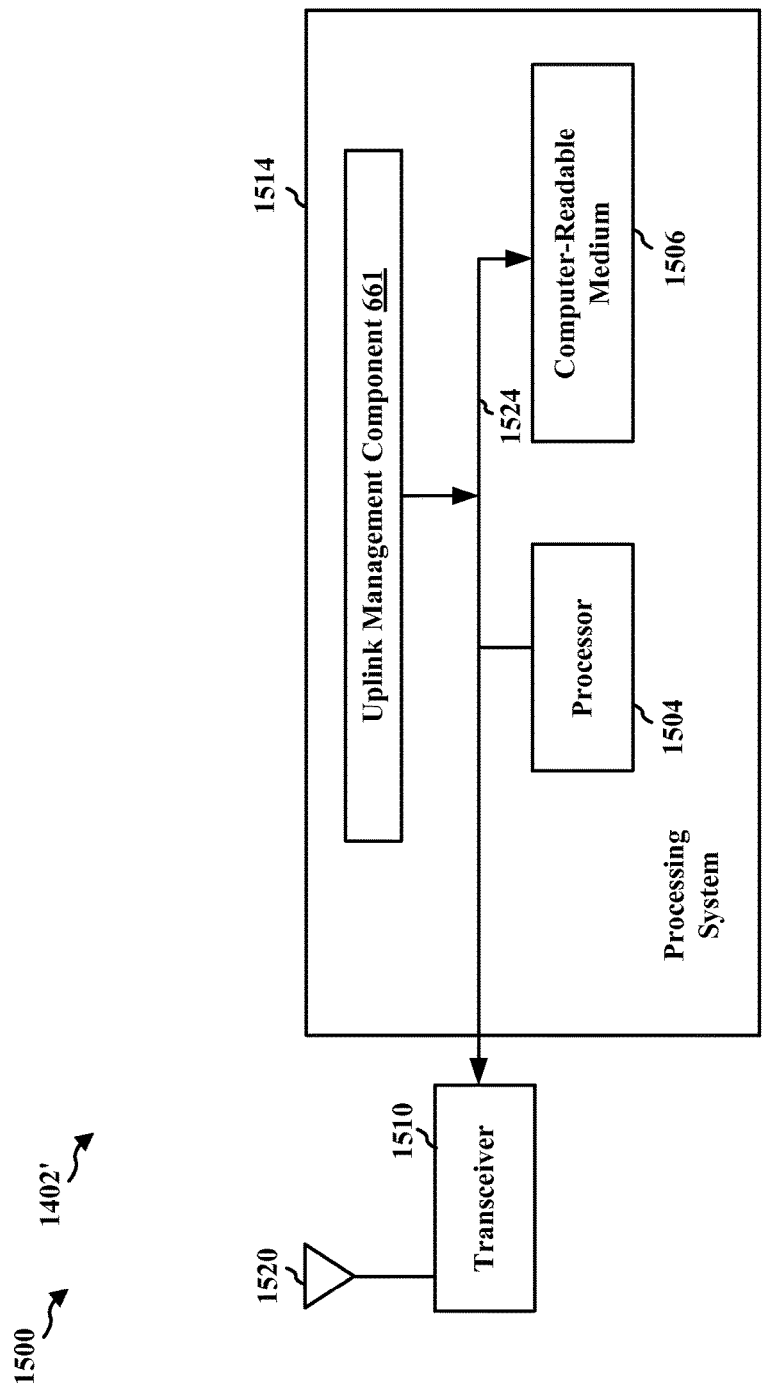
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. Like apparatus 1402 of FIG. 14, apparatus 1402' and/or processing system 1514 may be a UE (e.g., UE 115 of FIG. 1, UE 206 of FIG. 2, or UE 650 of FIG. 6). The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the uplink management component 661 (see, e.g., FIG. 12), and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. In addition, the transceiver 1510 may be configured to transmit at least control signals to one or more network entities and may potentially include transmitting component 1212 of FIG. 12. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of uplink management component 661 (see, e.g., FIG. 12). The modules/components may be software modules running in the processor 1504, resident/stored in the computer-readable medium 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402' for wireless communication includes means for receiving, from a network entity, an uplink bandwidth allocation map, the uplink bandwidth allocation map defining an uplink bandwidth allocation for the UE for each of a plurality of uplink transmission window lengths; means for storing the uplink bandwidth allocation map in a memory; means for receiving, from the network entity and after receiving the uplink bandwidth allocation map, an uplink transmission window length for an uplink transmission window; means for querying the uplink bandwidth allocation map in the memory to determine the uplink bandwidth allocation corresponding to the received uplink transmission window length; and means for transmitting a control signal during the window length based on the uplink bandwidth allocation.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communication, comprising:
   selecting, by a network entity, an uplink control channel transmission window length from a plurality of uplink control channel transmission window lengths for an uplink control channel transmission window, wherein each of the plurality of uplink control channel transmission window lengths corresponds to a variable-sized transmission time interval (TTI) defining the uplink control channel transmission window during which one or more user equipments (UEs) served by the network entity can communicate and is associated with a bandwidth allocation on the uplink control channel during the uplink control channel transmission window; and
   transmitting, by the network entity, an indication of the uplink control channel transmission window length to at least one of the one or more UEs for allowing the one or more UEs to transmit on the uplink control channel during the uplink control channel transmission window in accordance with the associated bandwidth allocation.

2. The method of claim 1, further comprising:
   generating, by the network entity, an uplink control channel bandwidth allocation map, the uplink control channel bandwidth allocation map defining the bandwidth allocation for the at least one of the one or more UEs for at least one of the plurality of uplink control channel transmission window lengths; and
   transmitting, by the network entity, the uplink control channel bandwidth allocation map to at least one of the one or more UEs.

3. The method of claim 1, wherein the uplink control channel transmission window length is selected based at least in part on a UE uplink load corresponding to the one or more UEs.

4. The method of claim 2, wherein the generating and transmitting occur periodically and according to a periodicity time period.

5. The method of claim 1, wherein the uplink control channel transmission window length is selected based at least in part on a number of the one or more UEs associated with the network entity.

6. The method of claim 2, further comprising:
   determining that a plurality of the one or more UEs are to share a bandwidth according to the uplink control channel bandwidth allocation map;
   generating a unique code for at least one of the plurality of the one or more UEs to enable code division multiplexing of uplink transmissions by at least one of the plurality of the one or more UEs; and
   transmitting the unique code to at least one of the plurality of the one or more UEs.

7. The method of claim 1, wherein the uplink control channel bandwidth allocation is a contiguous bandwidth allocation.

8. The method of claim 1, wherein the uplink control channel bandwidth allocation comprises an allocation of a plurality of discontinuous bandwidth ranges.

9. An apparatus for communication, comprising:
   a memory; and
   a processor in communication with the memory, wherein the processor is configured to:
      select an uplink control channel transmission window length from a plurality of uplink control channel transmission window lengths for an uplink control channel transmission window, wherein each of the plurality of uplink control channel transmission window lengths corresponds to a variable-sized transmission time interval (TTI) defining the uplink control channel transmission window during which one or more user equipments (UEs) served by a network entity can communicate and is associated with a bandwidth allocation on the uplink control channel during the uplink control channel transmission window; and
      transmit an indication of the uplink control channel transmission window length to at least one of the one or more UEs for allowing the one or more UEs to transmit on the uplink control channel during the uplink control channel transmission window in accordance with the associated bandwidth allocation.

10. The apparatus of claim 9, wherein the processor is further configured to:
    generate an uplink control channel bandwidth allocation map, the uplink control channel bandwidth allocation map defining the bandwidth allocation for the at least one of the one or more UEs for at least one of the plurality of uplink control channel transmission window lengths; and
    transmit the uplink control channel bandwidth allocation map to at least one of the one or more UEs.

11. The apparatus of claim 9, wherein the uplink control channel transmission window length is selected based at least in part on a UE uplink load corresponding to the one or more UEs.

12. The apparatus of claim 10, wherein the processor configured to generate the uplink control channel bandwidth allocation map and the processor configured to transmit the uplink control channel bandwidth allocation map are executed by the processor periodically and according to a periodicity time period.

13. The apparatus of claim 9, wherein the uplink control channel transmission window length is selected based at least in part on a number of the one or more UEs associated with the network entity.

14. The apparatus of claim 10, wherein the processor is further configured to:
    determine that a plurality of the one or more UEs are to share a bandwidth according to the uplink control channel bandwidth allocation map;
    generate a unique code for at least one of the plurality of the one or more UEs to enable code division multiplexing of uplink transmissions by at least one of the plurality of the one or more UEs; and
    transmit the unique code to at least one of the plurality of the one or more UEs.

15. The apparatus of claim 9, wherein the uplink control channel bandwidth allocation is a contiguous bandwidth allocation.

16. The apparatus of claim 9, wherein the uplink control channel bandwidth allocation comprises an allocation of a plurality of discontinuous bandwidth ranges.

17. An apparatus for communication, comprising:
  means for selecting, by a network entity, an uplink control channel transmission window length from a plurality of uplink control channel transmission window lengths for an uplink control channel transmission window, wherein each of the plurality of uplink control channel transmission window lengths corresponds to a variable-sized transmission time interval (TTI) defining the uplink control channel transmission window during which one or more user equipments (UEs) served by the network entity can communicate and is associated with bandwidth allocation on the uplink control channel during the uplink control channel transmission window; and
  means for transmitting, by the network entity, an indication of the uplink control channel transmission window length to at least one of the one or more UEs for allowing the one or more UEs to transmit on the uplink control channel during the uplink control channel transmission window in accordance with the associated bandwidth allocation.

18. The apparatus of claim 17, further comprising:
  means for generating, by the network entity, an uplink control channel bandwidth allocation map, the uplink control channel bandwidth allocation map defining the bandwidth allocation for the at least one of the one or more UEs for at least one of the plurality of uplink control channel transmission window lengths; and
  means for transmitting, by the network entity, the uplink control channel bandwidth allocation map to at least one of the one or more UEs.

19. The apparatus of claim 17, wherein the uplink control channel transmission window length is selected based at least in part on a UE uplink load corresponding to the one or more UEs.

20. The apparatus of claim 18, wherein the means for generating generates the uplink control channel bandwidth allocation map and the means for transmitting transmits the uplink control channel bandwidth allocation map periodically and according to a periodicity time period.

21. The apparatus of claim 17, wherein the uplink control channel transmission window length is selected by the means for selecting based at least in part on a number of the one or more UEs associated with the network entity.

22. The apparatus of claim 18, further comprising:
  means for determining that a plurality of the one or more UEs are to share a bandwidth according to the uplink control channel bandwidth allocation map;
  means for generating a unique code for at least one of the plurality of the one or more UEs to enable code division multiplexing of uplink transmissions by at least one of the plurality of the one or more UEs; and
  means for transmitting the unique code to at least one of the plurality of the one or more UEs.

23. The apparatus of claim 17, wherein the uplink control channel bandwidth allocation is a contiguous bandwidth allocation.

24. The apparatus of claim 17, wherein the uplink control channel bandwidth allocation comprises an allocation of a plurality of discontinuous bandwidth ranges.

25. A non-transitory computer-readable medium storing computer-executable code for communication, comprising:
  code for selecting, by a network entity, an uplink control channel transmission window length from a plurality of uplink control channel transmission window lengths for an uplink control channel transmission window, wherein each of the plurality of uplink control channel transmission window lengths corresponds to a variable-sized transmission time interval (TTI) defining the uplink control channel transmission window during which one or more user equipments (UEs) served by the network entity can communicate and is associated with bandwidth allocation on the uplink control channel during the uplink control channel transmission window; and
  code for transmitting, by the network entity, an indication of the uplink control channel transmission window length to at least one of the one or more UEs for allowing the one or more UEs to transmit on the uplink control channel during the uplink control channel transmission window in accordance with the associated bandwidth allocation.

26. The non-transitory computer-readable medium of claim 25, further comprising:
  code for generating, by the network entity, an uplink control channel bandwidth allocation map, the uplink control channel bandwidth allocation map defining the bandwidth allocation for the at least one of the one or more UEs for at least one of the plurality of uplink control channel transmission window lengths; and
  code for transmitting, by the network entity, the uplink control channel bandwidth allocation map to at least one of the one or more UEs.

27. The non-transitory computer-readable medium of claim 25, wherein the uplink control channel transmission window length is selected based at least in part on a UE uplink load corresponding to the one or more UEs.

28. The computer-readable medium of claim 26, wherein the instructions executable to generate and transmit are executed periodically and according to a periodicity time period.

29. The computer-readable medium of claim 25, wherein the instructions operable to select the uplink control channel transmission window length are operable to select the uplink control channel transmission window length based at least in part on a number of the one or more UEs associated with the network entity.

30. The computer-readable medium of claim 26, wherein the code further comprises instructions executable to:
  determine that a plurality of the one or more UEs are to share a bandwidth according to the uplink control channel bandwidth allocation map;
  generate a unique code for at least one of the plurality of the one or more UEs to enable code division multiplexing of uplink transmissions by at least one of the plurality of the one or more UEs; and
  transmit the unique code to at least one of the plurality of the one or more UEs.

* * * * *